(12) United States Patent
Zhou

(10) Patent No.: US 12,258,060 B1
(45) Date of Patent: Mar. 25, 2025

(54) ASSEMBLY STORAGE RACK

(71) Applicant: JINHUA ZHUJIA COMMODITY CO., LTD., Zhejiang (CN)

(72) Inventor: Yongli Zhou, Zhejiang (CN)

( * ) Notice: Subject to any disclaimer, the term of this patent is extended or adjusted under 35 U.S.C. 154(b) by 0 days.

(21) Appl. No.: 18/505,573

(22) Filed: Nov. 9, 2023

(30) Foreign Application Priority Data

Sep. 23, 2023 (CN) .......................... 202311234073.2

(51) Int. Cl.
- *A47B 47/00* (2006.01)
- *A47B 57/18* (2006.01)
- *B62B 3/02* (2006.01)

(52) U.S. Cl.
CPC ............ *B62B 3/02* (2013.01); *A47B 47/0083* (2013.01); *A47B 57/18* (2013.01); *A47B 2220/0002* (2013.01); *B62B 2205/006* (2013.01); *B62B 2206/00* (2013.01)

(58) Field of Classification Search
CPC . B62B 3/02; B62B 2205/006; B62B 2206/00; A47B 47/0083; A47B 57/18; A47B 2220/0002; A47B 2031/002; A47B 2031/004; A47B 2031/003; A47F 2003/066
USPC ......................................... 211/85.8; 280/79.3
See application file for complete search history.

(56) References Cited

U.S. PATENT DOCUMENTS

| | | | | |
|---|---|---|---|---|
| 2,886,186 A * | 5/1959 | Hamilton | ............... | A47B 31/00 211/186 |
| 3,007,708 A * | 11/1961 | Ochs | ...................... | B62B 3/002 211/187 |
| 3,536,016 A * | 10/1970 | Chesley | ............. | A47B 87/0215 108/53.5 |
| 3,589,746 A * | 6/1971 | Inglis | ...................... | A47B 57/12 211/187 |
| 3,719,408 A * | 3/1973 | Fullington | ............. | A47B 71/00 312/236 |
| 4,316,593 A * | 2/1982 | Miner | ....................... | A47F 5/14 211/90.03 |
| 5,065,873 A * | 11/1991 | Tseng | ..................... | A47B 57/54 211/186 |
| 5,326,062 A * | 7/1994 | Remmers | ............... | A47B 55/02 248/250 |
| 6,123,209 A * | 9/2000 | Tseng | ................... | A47B 47/021 211/186 |
| 6,796,565 B2* | 9/2004 | Choi | ........................ | B62B 3/02 280/47.35 |
| 6,971,528 B2* | 12/2005 | Chen | ...................... | A47B 57/40 211/187 |
| 7,213,817 B2* | 5/2007 | Cheung | .................. | B62B 3/025 280/47.35 |

(Continued)

*Primary Examiner* — Jennifer E. Novosad

(57) ABSTRACT

An assembly storage rack, which comprises two sets of vertically arranged upright rods, at least two storage baskets are arranged between the upright rods, and adjustment blocks are arranged on each of the upright rods, the adjustment blocks and the upright rods are relatively fixed and pre-installed as the integral modular components, the storage baskets are detachably connected to the adjustment blocks on the upright rods on both sides; the storage basket comprises a first storage basket and a second storage basket arranged vertically in sequence, the first storage basket can be placed in the second storage basket; first adjustment blocks are arranged between the first storage basket and the upright rods.

19 Claims, 9 Drawing Sheets

(56) References Cited

U.S. PATENT DOCUMENTS

| | | | |
|---|---|---|---|
| 7,988,160 B2 * | 8/2011 | Lindner | B62B 3/008 280/638 |
| D703,412 S * | 4/2014 | Snider | D34/21 |
| 9,187,111 B2 * | 11/2015 | Lai | A47B 57/404 |
| 10,499,733 B2 * | 12/2019 | Felsenthal | A47B 47/00 |
| 10,959,516 B2 * | 3/2021 | Cheng | A47B 47/024 |
| 11,001,286 B2 * | 5/2021 | Liu | A47B 57/36 |
| 2002/0027114 A1 * | 3/2002 | Krusell | A47B 81/00 211/186 |
| 2005/0023785 A1 * | 2/2005 | Liu | B25H 3/06 280/79.3 |
| 2005/0062246 A1 * | 3/2005 | Kang | A47B 31/00 280/47.35 |
| 2006/0017247 A1 * | 1/2006 | Farley | B62B 3/104 280/79.3 |
| 2006/0032829 A1 * | 2/2006 | Hutzler | A47B 13/02 211/90.03 |
| 2007/0096412 A1 * | 5/2007 | Sharp | B62B 5/06 280/47.24 |
| 2008/0203042 A1 * | 8/2008 | Felsenthal | A47B 47/027 211/153 |
| 2009/0152225 A1 * | 6/2009 | Lee | A47B 47/024 108/106 |
| 2010/0288717 A1 * | 11/2010 | Morandi | A47B 55/02 211/187 |
| 2012/0061930 A1 * | 3/2012 | Lin | B25H 3/04 280/47.35 |
| 2014/0217690 A1 * | 8/2014 | Schumaker | B62B 5/00 280/47.35 |
| 2016/0235197 A1 * | 8/2016 | Kabacinski | B62B 3/005 |
| 2020/0214443 A1 * | 7/2020 | Cheng | A47B 47/021 |
| 2021/0024111 A1 * | 1/2021 | Chiao | B62B 3/025 |
| 2023/0309692 A1 * | 10/2023 | Liu | A47B 31/04 211/126.12 |
| 2024/0174277 A1 * | 5/2024 | Hsu | B62B 3/005 |

* cited by examiner

ASSEMBLY STORAGE RACK

1. TECHNICAL FIELD

The invention relates to the technical field of storage racks, in particular to an assembly storage rack.

2. BACKGROUND ART

The storage rack is a shelf composed of base plates and pillars to store sundries. Most of them are supported by strip brackets and supported by the bottom plates. They have unique shapes, smart designs, easy assembly and disassembly, are clean and bright, the open design allows for easy visibility of stored items.

Most of the storage racks on the market consist of several upright poles, several identical baskets are detachably arranged on the upright poles, and the cross-section of the baskets is trapezoidal. During transportation, the baskets are stacked one by one, and the upright poles are disassemble and stored inside the baskets. However, due to the same size of thses baskets, they fit tightly when stacked, making it inconvenient to disassemble them from each other during the assembly process. In order to solve this problem, some manufacturers will produce storage racks with different sizes of baskets. For example, Chinese invention patent application CN 201920931282.5 discloses a foldable storage rack comprises at least three storage baskets, the sizes of the first storage basket, the second storage basket, and the third storage basket increase in sequence, so that during transportation, the first storage basket is completely placed in the second storage basket, and the second storage basket is completely placed in the third basket; compared with the foldable storage racks previously sold on the market, this foldable storage rack can place the first storage basket inside the second storage basket, and the second storage basket can be placed inside the third storage basket.

The biggest advantage of the aforementioned storage rack is that it can be folded during transportation, thereby reducing the space it occupies. This makes it easier to transport and reduces transportation costs. Additionally, the baskets of various sizes are convenient for stacking and placing them on top of each other. However, in this structure, the baskets are completely fixed to the upright poles by bolts. After prolonged use, the position where the baskets and the upright poles connect to the bolts can easily become deformed or damaged.

3. SUMMARY OF THE INVENTION

In order to overcome the deficiencies in the prior art, the object of the invention is to provide an assembly storage rack with a stable structure and easy assembly.

The object of the invention is achieved in the following way: an assembly storage rack comprises two sets of vertically arranged upright rods, at least two storage baskets are arranged between the upright rods, the storage baskets are arranged vertically at intervals, and adjustment blocks are arranged on each of the upright rods, the adjustment blocks and the upright rods are relatively fixed and pre-installed as the integral modular components, the storage baskets are detachably connected to the adjustment blocks on the upright rods on both sides; when the storage baskets are detached from the adjustment blocks, the pre-installed adjustment blocks and upright rods can be stored in the storage baskets;

The storage basket at least comprises a first storage basket and a second storage basket arranged vertically in sequence, the sizes of the first storage basket and the second storage basket increase in sequence, the first storage basket can be placed in the second storage basket;

First adjustment blocks are arranged between the first storage basket and the upright rods, the second fasteners pass through the upright rods, the first adjustment blocks and the first storage basket in sequence and fix the three; the effective installation length of the first storage basket and the first adjustment blocks on both sides is L1;

Second adjustment blocks are arranged between the second storage basket and the upright rods, the second fasteners pass through the upright rods, the second adjustment blocks and the second storage basket in sequence and fix the three; the effective installation length of the second storage basket and the second adjustment blocks on both sides is L2;

The lengths of L1 and L2 are the same or nearly the same, when the storage rack is in use, the upright rods on both sides remain vertical.

Further, the adjustment block is provided with a positioning groove, and the upright rod is inserted into the positioning groove, the adjustment block is provided with a first fastener, the first fastener first relatively fixes the adjustment block and the upright rod, so that the upright rod match with the positioning groove, thereby completing the installation of the adjustment block onto the upright rod, subsequently, the second fastener passes through the upright rod, the adjustment block and the storage basket in sequence and secures them together.

Further, the upright rod comprises a first rod and a second rod that are detachably arranged, the first rod and the second rod are respectively pre-installed with the first adjustment block and second adjustment block, the first adjustment block and the second adjustment block are respectively provided with indication marks, or alternatively, the first rod and the second rod are respectively provided with indication marks.

Further, the first rod is provided with a plug-in part, the second rod is provided with a plug-in hole, the plug-in part is inserted into the plug-in hole, one adjustment block is arranged on the side of the plug-in hole, and the second fastener passes through the plug-in part and the side wall of the plug-in hole to relatively fix the first rod and the second rod, and the second fastener passes through the adjustment block to relatively fix the storage basket and the adjustment block.

Further, the adjustment block is provided with a positioning protrusion, and the side of the storage basket is provided with a positioning hole adapted to the positioning protrusion, the positioning protrusion cooperates with the positioning hole to position and install the storage basket and the adjustment block.

Further, the positioning protrusion is provided with an elastic hook, the elastic hook passes through the positioning hole and keeps the positioning protrusion and the positioning hole matched.

Further, the elastic hook is provided with an inclined guide surface, and the elastic hook is guided through the positioning hole through the guide surface.

Further, connecting seats are arranged on the upright rods, and the connecting seats are respectively provided with mounting protrusions connected to the upright rods on both sides of the storage basket, the upright rods are provided with mounting holes, and the mounting holes are located on one side of the adjustment blocks, during the assembly of the storage rack, after the mounting protrusions are inserted into the mounting holes, the second fasteners pass through the mounting protrusions and the side wall of the mounting holes to relatively fix the upright rods and the connecting seats, and secure the connecting seats, the upright rods, the adjustment blocks, and the storage baskets together.

Further, the side of the storage basket is equipped with an annular protruding edge, the adjustment block abuts against the protruding edge and supports the storage basket.

Further, the storage basket is provided with inclined abutting walls on both sides, and the lower parts of the abutting walls are inclined toward the middle of the storage basket, the adjustment block is provided with a supporting wall adapted to the abutting wall.

Compared with the prior art, the invention has the following advantages:

1. In the invention, the adjustment blocks that are detachably connected to the storage baskets provide auxiliary support for the storage baskets, which helps disperse the stress on the storage baskets and the upright rods, avoids local deformation and damage of the storage baskets and the upright rods, and helps extend the service life of the storage rack; in this structure, the adjustment blocks and the upright rods will be pre-installed, and the adjustment blocks and the upright rods will remain connected during the transportation, so that the user can quickly assemble the storage rack, it is convenient for the user to use; since the effective installation length of the first storage basket and the first adjustment blocks on both sides L1 and the effective installation length of the second storage basket and the second adjustment blocks on both sides L2 are the same or nearly the same, it avoids the tilt of the upright rods caused by the different sizes of the storage baskets, which is beneficial to improving the aesthetics of the storage rack, making it easier to place the storage rack stably.

2. In the invention, the arrangement of positioning grooves facilitates the positioning and installation of the adjustment blocks and the upright rods, facilitates the pre-installation of the adjustment blocks and the upright rods, and prevents the adjustment blocks from tilting and affecting the positioning and installation of the storage baskets, which facilitates the rapid assembly of the storage rack and it is convenient for the user to use; in this structure, the first fasteners first fix the adjustment blocks to the upright rods, and then the second fasteners fix the upright rods, adjustment blocks and storage baskets; multiple sets of fixing methods can improve the stability of the adjustment blocks during installation and prevent the adjustment blocks from loosening during use.

3. In the invention, the detachable first rods and the second rods facilitate the user to disassemble the upright rods and store them in the storage basket, which facilitates the storage of the storage rack, the setting of the indication marks facilitates the user to identify each rod or adjustment blocks, and avoids installation errors in the position of the rods during the assembly process, thereby affecting the connection and cooperation between the storage baskets and the adjustment blocks; in this structure, the second fasteners not only connect the first rods to the second rods, but also connect the storage baskets to the upright rods, which facilitates the rapid assembly of the storage rack and improves the stabilities of the adjustment blocks and the upright rods during the installation.

4. In the invention, the settings of the positioning protrusions and positioning holes facilitate the positioning and installation of the adjustment blocks and the storage baskets, and facilitate the rapid assembly of the adjustment blocks and the storage baskets; the setting of the elastic hooks facilitates the stable connection between the adjustment blocks and the storage baskets, and prevents the adjustment blocks and the storage baskets from accidentally detaching during use; the setting of the guide surface facilitates the elastic hooks to quickly pass through the positioning holes, and facilitates the quick connection and cooperation between the adjustment blocks and the storage baskets.

5. In the invention, the upright rods on both sides of the storage baskets are connected through connecting seats, which is beneficial to improving the stability of the structure of the storage rack, in this structure, the second fasteners can not only relatively fix the upright rods, the adjustment blocks and the storage baskets, but also relatively fix the upright rods and the connecting seats, which facilitates the assembly and production of the storage rack.

6. In the invention, the adjustment blocks can support the storage baskets through the protruding edges, which is beneficial to dispersing the stress on the storage baskets and avoiding local damage to the storage baskets due to concentrated stress on the storage baskets, this structure is conducive to the stable installation of the storage baskets and prevents the storage baskets from tilting and turning over; the inclined abutting walls and supporting walls allow the adjustment blocks to support the storage baskets, which helps to distribute the stress on the storage baskets and ensures stable installation of the storage baskets.

4. BRIEF DESCRIPTION OF ACCOMPANY DRAWINGS

Figure 1:
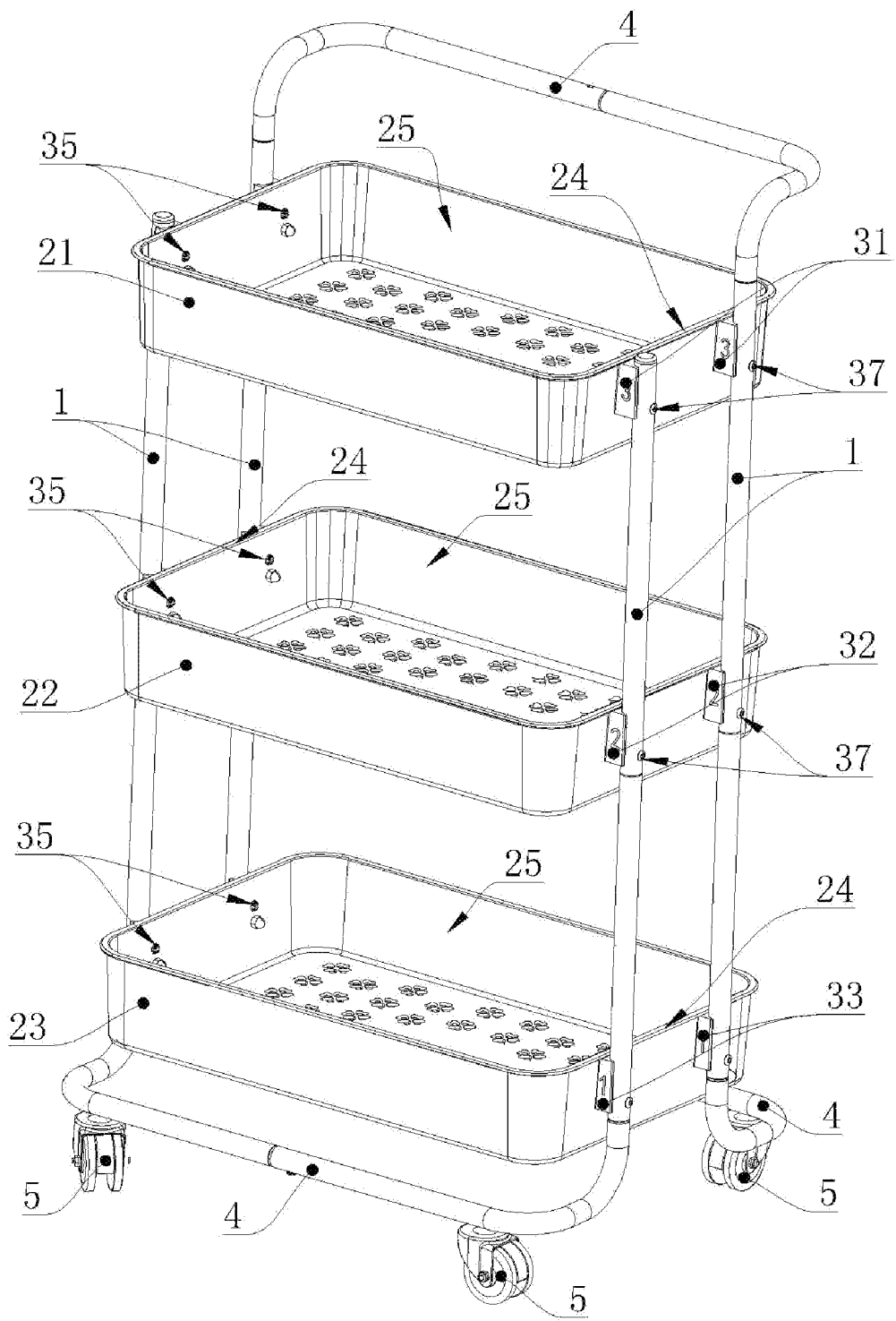
FIG. 1 is a schematic diagram 1 of the structure of the invention.
Figure 2:
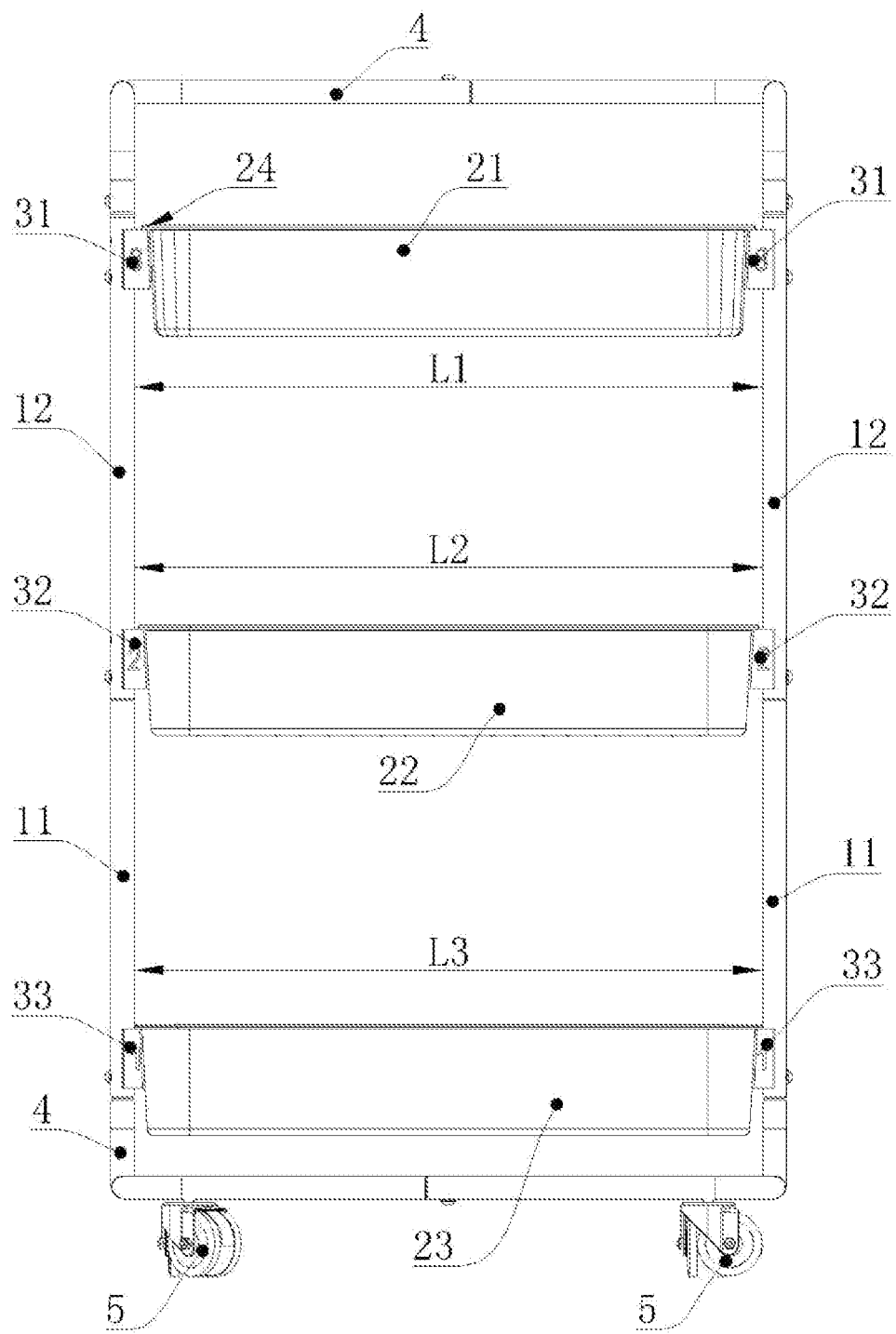
FIG. 2 is a schematic diagram 2 of the structure of the invention.
Figure 3:
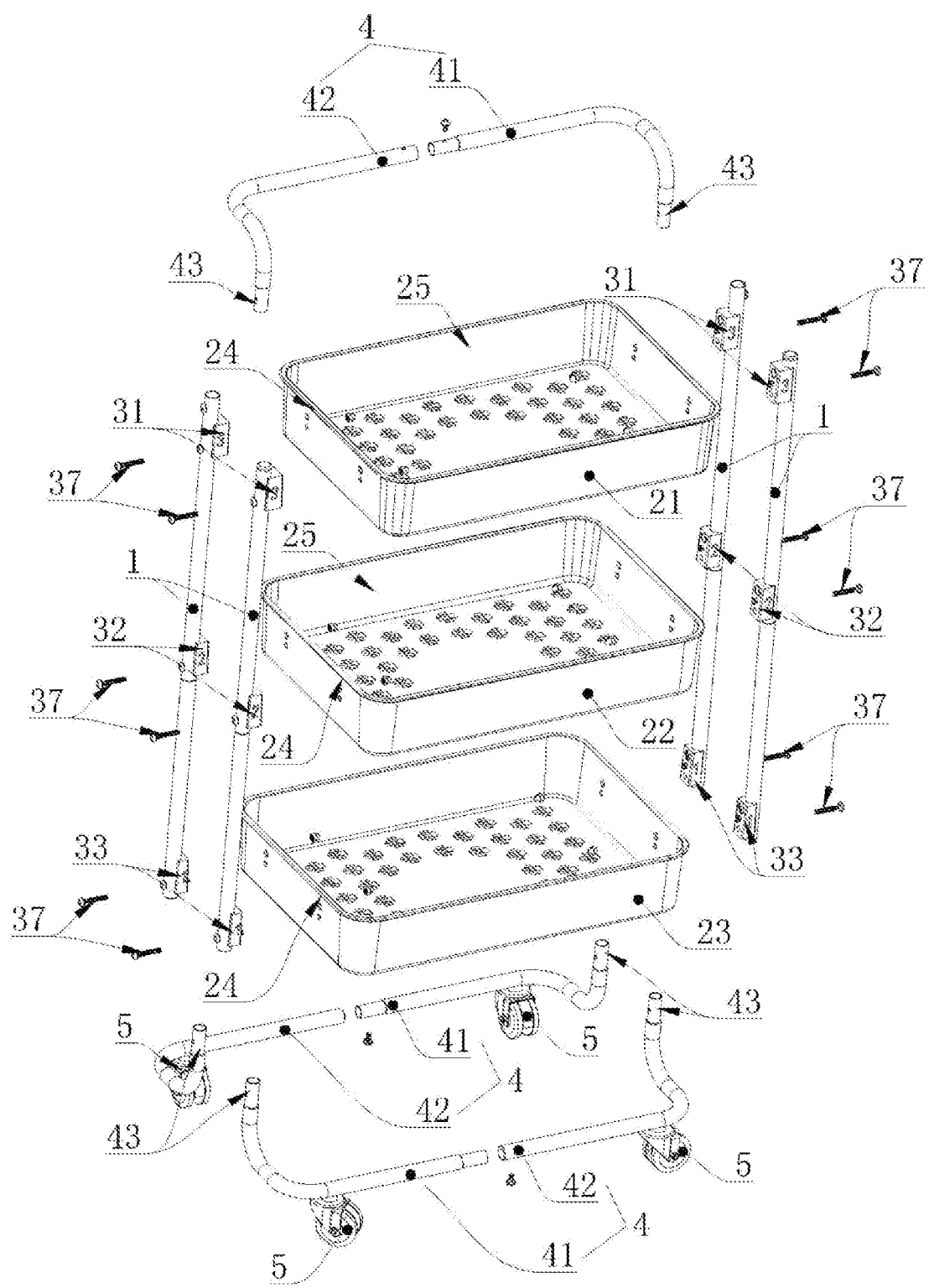
FIG. 3 is an exploded diagram of the invention.
Figure 4:
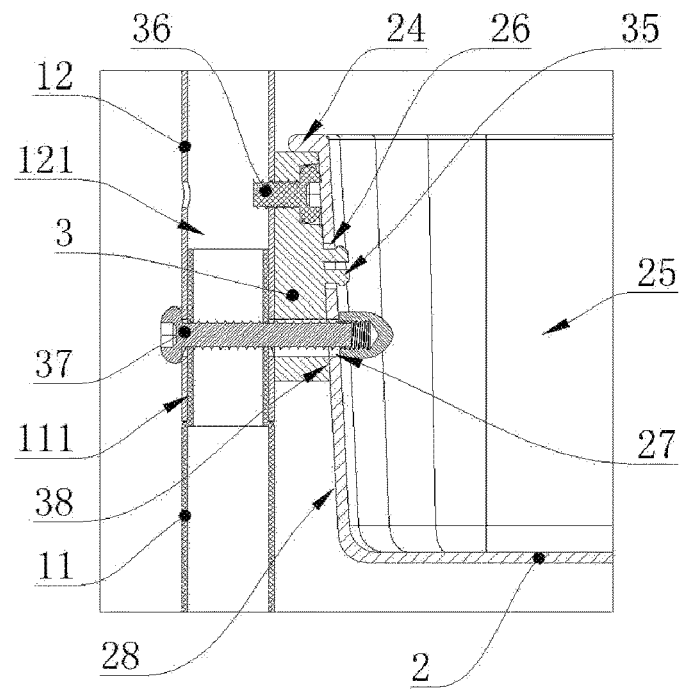
FIG. 4 is a partial cross-sectional view of the connection structure between the upright rod, adjustment block and storage basket of the invention.
Figure 5:
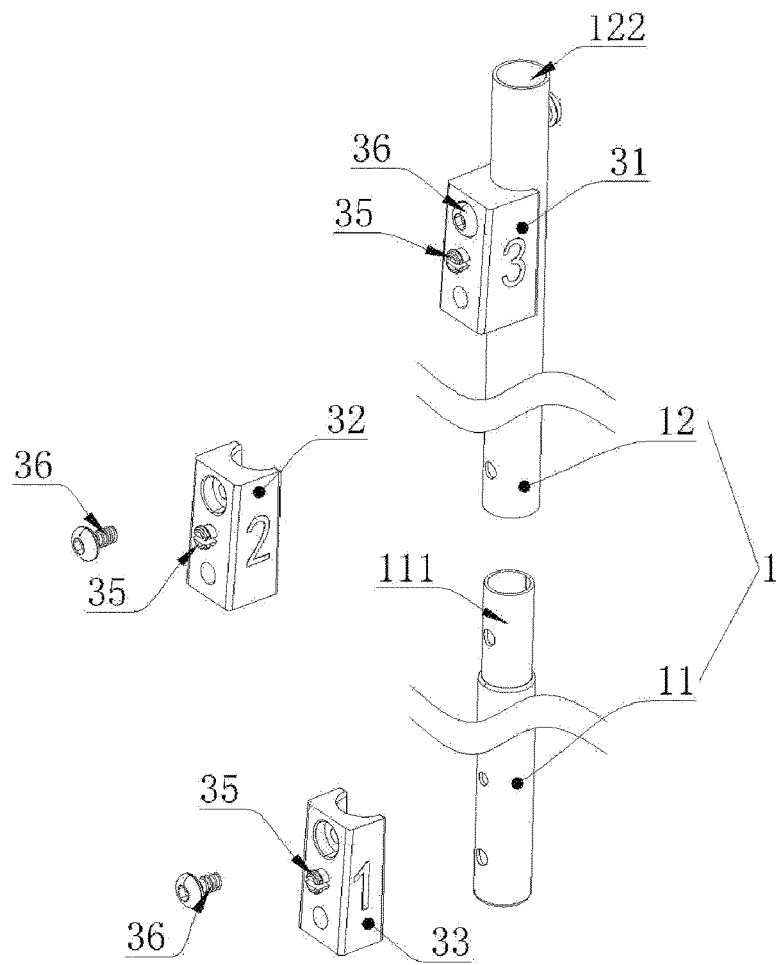
FIG. 5 is an exploded diagram of the connection structure between the upright rod and the adjustment block of the invention.
Figure 6:
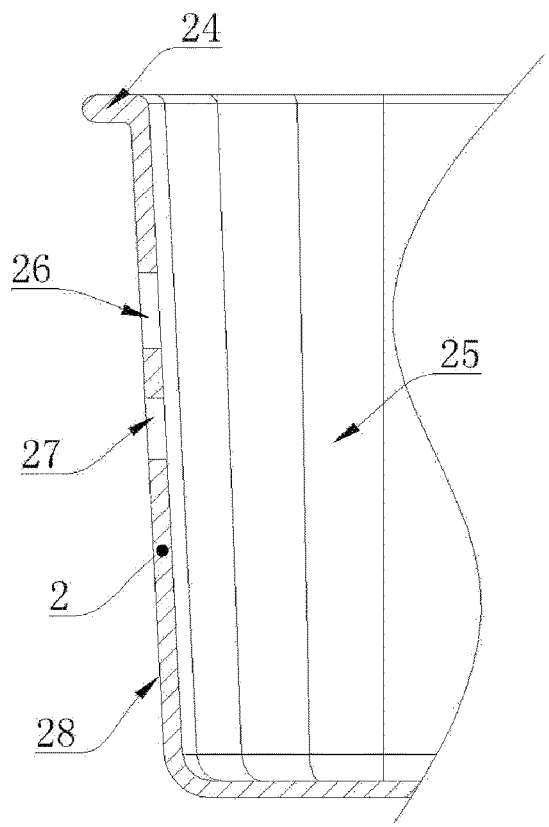
FIG. 6 is a partial cross-sectional view of the storage basket of the invention.
Figure 7:
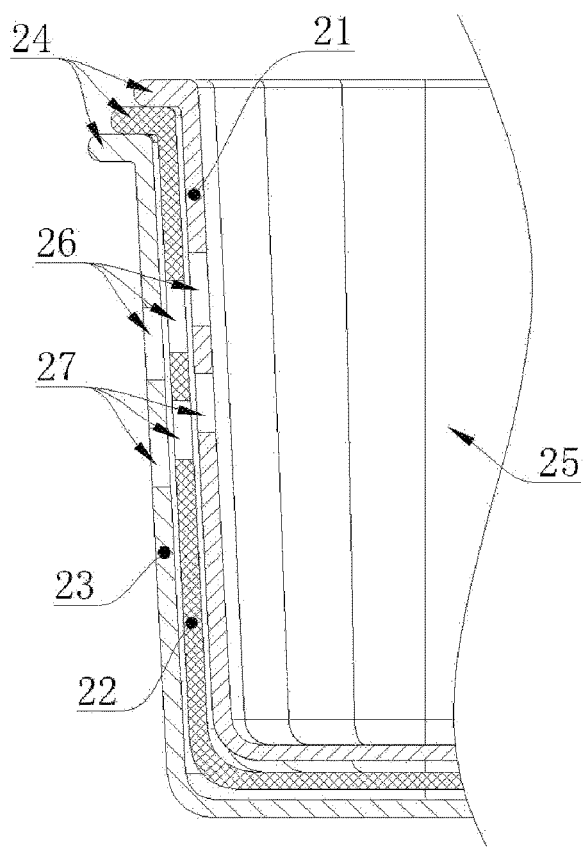
FIG. 7 is a partial cross-sectional view of the storage baskets of the invention when they are stacked on top of each other.

As shown in the figures: 1 upright rod, 11 first rod, 12 second rod, 111 plug-in part, 121 plug-in hole, 122 mounting hole, 2 storage basket, 21 first storage basket, 22 second storage basket, 23 third storage basket, 24 protruding edge, 25 inner cavity, 26 positioning hole, 27 first through hole, 28 abutting wall, 3 adjustment block, 31 first adjustment block, 32 second adjustment block, 33 third adjustment blocks, 34 positioning protrusion, 35 elastic hook, 36 first fastener, 37 second fastener, 38 supporting wall, 311 effective support part, 312 positioning groove, 313 countersunk hole, 314 second through hole, 315 keep-space groove, 316 supporting protruding edge, 317 reinforcing rib, 318 indication mark, 351 guide surface, 4 connecting seat, 41 first connecting rod, 42 second connecting rod, 43 mounting protrusion, 44 third fastener, 411 plug-in protrusion, 421 plug-in slot, 5 support wheel.

5. SPECIFIC EMBODIMENT OF THE INVENTION

The invention will be further described below with specific embodiments in combination with the accompanying drawings.

Referring to FIG. 1-12, an assembly storage rack comprises two sets of vertically arranged upright rods 1, at least two storage baskets 2 are arranged between the upright rods 1, the storage baskets 2 are arranged vertically at intervals, and adjustment blocks 3 are arranged on each of the upright rods 1, the adjustment blocks 3 and the upright rods 1 are relatively fixed and pre-installed as the integral modular components, the storage baskets 2 are detachably connected to the adjustment blocks 3 on the upright rods 1 on both sides; when the storage rack is transported, the storage baskets 2 are detached from the adjustment blocks 3, the pre-installed adjustment blocks 3 and upright rods 1 can be stored in the storage baskets; in this structure, the adjustment blocks 3 that are detachably connected to the storage baskets 2 provide auxiliary support for the storage baskets 2, which helps disperse the stress on the storage baskets 2 and the upright rods 1, avoids local deformation and damage of the storage baskets 2 and the upright rods 1, and helps extend the service life of the storage rack; the adjustment blocks 3 and the upright rods 1 will be pre-installed, and the adjustment blocks 3 and the upright rods 1 will remain connected during the transportation, so that the user can quickly assemble the storage rack, it is convenient for the user to use.

The storage basket 2 at least comprises a first storage basket 21 and a second storage basket 22 arranged vertically in sequence, the sizes of the first storage basket 21 and the second storage basket 22 increase in sequence, when the first storage basket 21 and the second storage basket 22 are stacked on each other, the first storage basket 21 can be placed in the second storage basket 22, which is beneficial to minimizing the occupied space and facilitating storage and transportation of the storage rack;

first adjustment blocks 31 are arranged between the first storage basket 21 and the upright rods 1, the second fasteners 37 pass through the upright rods 1, the first adjustment blocks 31 and the first storage basket 21 in sequence and fix the three; the effective installation length of the first storage basket 21 and the first adjustment blocks 31 on both sides is L1; second adjustment blocks 32 are arranged between the second storage basket 22 and the upright rods 1, the second fasteners 37 pass through the upright rods 1, the second adjustment blocks 32 and the second storage basket 22 in sequence and fix the three; the effective installation length of the second storage basket 22 and the second adjustment blocks 32 on both sides is L2; the lengths of L1 and L2 are the same or nearly the same, when the storage rack is in use, the upright rods 1 on both sides remain vertical, it avoids the tilt of the upright rods caused by the different sizes of the storage baskets, which is beneficial to improving the aesthetics of the storage rack, making it easier to place the storage rack stably.

The claims of the invention only state that the storage basket 2 comprises a first storage basket 21 and a second storage basket 22. In fact, three or more storage baskets 2 can be arranged on the storage rack, for its embodiment, please refer to the installation method of the first storage basket 21 and the second storage basket 22; as shown in the accompanying drawings, the storage basket 2 comprises a third storage basket 23, the first storage basket 21, the second storage basket 22 and the third storage basket 23 arranged vertically in sequence, the sizes of the first storage basket 21, the second storage basket 22 and the third storage basket 23 increase in sequence, during transportation, the second storage basket 22 can be placed in the third storage basket 23, the adjustment block 3 also comprises a third adjustment block 33, the effective installation length of the third storage basket 23 and the third adjustment blocks 33 on both sides is L3, the lengths of L1, L2 and L3 are the same or nearly the same, so that the distances between the upright poles 1 on both sides of the baskets are equal, this helps to keep the upright rods 1 on both sides vertical, which is beneficial to improving the aesthetics of the storage rack, making it easier to place the storage rack stably.

The adjustment block 3 is provided with a positioning groove 312, and the upright rod 1 is inserted into the positioning groove 312, the adjustment block 3 is provided with a first fastener 36, the arrangement of positioning grooves 312 facilitates the positioning and installation of the adjustment blocks 3 and the upright rods 1, facilitates the pre-installation of the adjustment blocks 3 and the upright rods 1, and prevents the adjustment blocks 3 from tilting and affecting the positioning and installation of the storage baskets 2, which facilitates the rapid assembly of the storage rack and it is convenient for the user to use.

The first fastener 36 first relatively fixes the adjustment block 3 and the upright rod 1, so that the upright rod 1 match with the positioning groove 312, thereby completing the installation of the adjustment block 3 onto the upright rod 1, subsequently, the second fastener 37 passes through the upright rod 1, the adjustment block 3 and the storage basket 2 in sequence and secures them together, in this structure, the first fasteners 36 first fix the adjustment blocks 3 to the upright rods 1, and then the second fasteners 37 fix the upright rods 1, adjustment blocks 3 and storage baskets 2; multiple sets of fixing methods can improve the stability of the adjustment blocks 3 during installation and prevent the adjustment blocks 3 from loosening during use.

The first fastener 36 passes through the adjustment block 3 and is detachably connected to the upright rod 1, and one end of the first fastener 36 is hidden between the adjustment block 3 and the storage basket 2, the storage basket 2 is arranged at one end of the first fastener 36 to prevent the first fastener 36 from being separated from the upright rod; in this structure, the first fasteners 36 first fix the adjustment blocks 3 to the upright rods 1, and then the second fasteners 37 fix the upright rods 1, adjustment blocks 3 and storage baskets 2; multiple sets of fixing methods can improve the stability of the adjustment blocks 3 during installation and prevent the adjustment blocks 3 from loosening during use.

The adjustment block 3 is provided with a countersunk hole 313, and the first fastener 36 is arranged in the countersunk hole 313 and connected to the upright rod 1, the adjustment block 3 is also provided with a second through hole 314, and the storage basket 2 is provided with a first through hole 27, the second fastener 37 passes through the upright pole 1, the first through hole 27 and the second through hole 314, so that the upright pole 1, the adjustment block 3 and the storage basket 2 are relatively fixed.

Preferably, the adjustment block 3 is provided with a keep-space groove 315 close to one side of the positioning groove 312, the keep-space groove 315 is provided with a number of supporting protruding edges 316 for abutting against the side wall of the upright pole 1, both ends of the supporting protruding edges 316 are respectively connected to the side walls of the keep-space groove 315; reinforcing ribs 317 are arranged between the supporting protruding edges 316 and also between the supporting protruding edge 316 and the side walls of the keep-space groove 315, the reinforcing ribs 317 are arranged perpendicularly to the supporting protruding edge 316; the setting of the keep-space groove 315 is conducive to reducing the shrinkage deformation of the positioning groove 312 during the process, and is conducive to the close cooperation between the positioning groove 312 and the upright pole 1, the settings of the supporting protruding edges 316 and the reinforcing ribs 317 are conducive to increasing the contact surface between the upright pole 1 and the adjustment block 3, and preventing the adjustment block 3 from being deformed or damaged.

Figure 8:
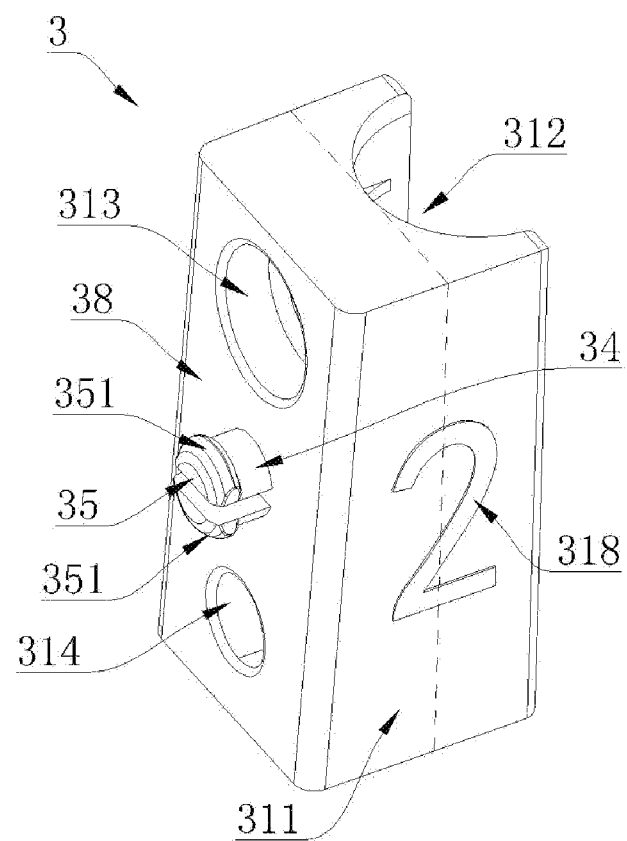
FIG. 8 is a schematic diagram 1 of the structure of the adjustment block of the invention.
Figure 9:
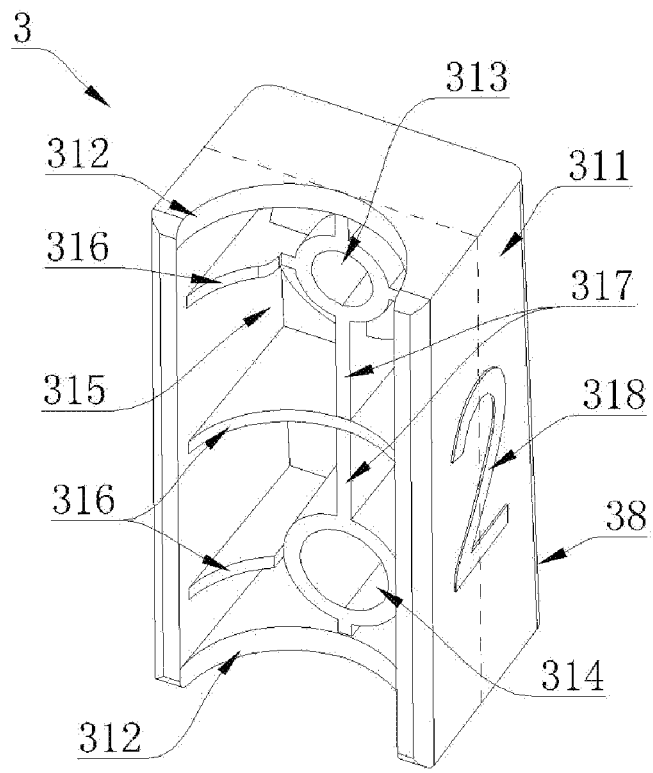
FIG. 9 is a schematic diagram 2 of the structure of the adjustment block of the invention.
Figure 10:
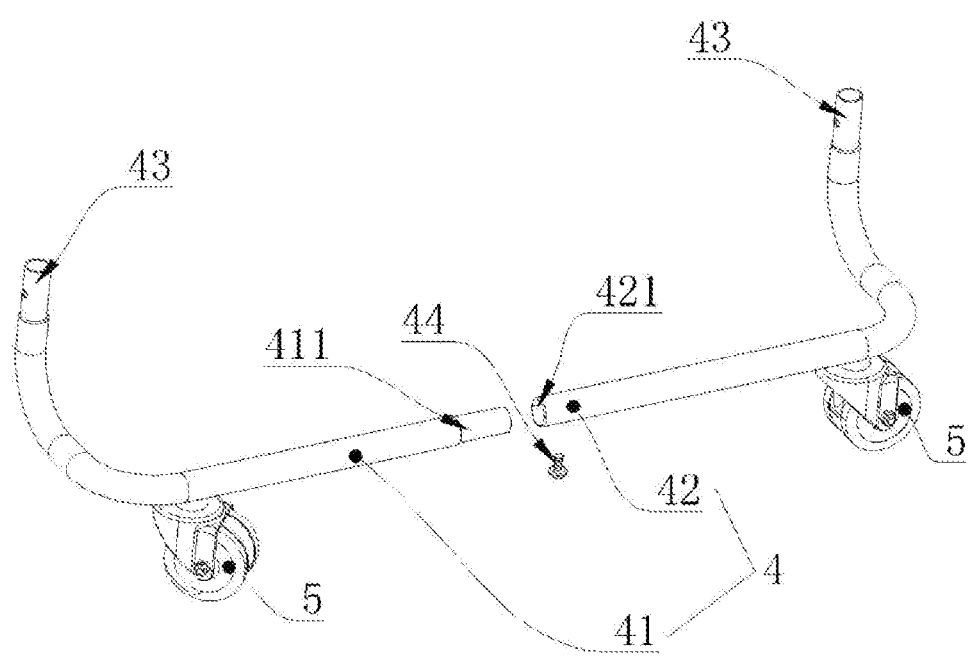
FIG. 10 is a schematic diagram of the connecting seat of the invention.

In this embodiment, the adjustment block 3 comprises an effective support part 311 on both sides that respectively abut against the storage basket 2 and the upright rod 1, the effective support part 311 is arranged on one side of the positioning groove 312, the keep-space groove 315 is arranged in the effective support part 311, the total length of the storage basket 2 and the effective support parts 311 on the second adjustment blocks 32 on both sides is the effective installation length; in this embodiment, the effective support part 311 is separated by a dotted line in FIG. 8 and FIG. 9, the width of the effective support part 311 is the distance between the side wall of the storage basket 2 and the side wall of the upright rod 1.

The upright rod 1 comprises a first rod 11 and a second rod 12 that are detachably arranged, the first rod 11 and the second rod 12 are respectively pre-installed with the first adjustment block 31 and second adjustment block 32, the first adjustment block 31 and the second adjustment block 32 are respectively provided with indication marks 318, or alternatively, the first rod 11 and the second rod 12 are respectively provided with indication marks 318, the detachable first rods 11 and the second rods 12 facilitate the user to disassemble the upright rods 1 and store them in the storage basket 2, which facilitates the storage of the storage rack, the setting of the indication marks 318 facilitates the user to identify each rod or adjustment blocks 3, and avoids installation errors in the position of the rods during the assembly process, thereby affecting the connection and cooperation between the storage baskets 2 and the adjustment blocks 3.

In this embodiment, the first rod 11 is provided with a plug-in part 111, the second rod 12 is provided with a plug-in hole 121, the plug-in part 111 is inserted into the plug-in hole 121, one adjustment block 3 is arranged on the side of the plug-in hole 121, and the second fastener 37 passes through the plug-in part 111 and the side wall of the plug-in hole 121 to relatively fix the first rod 11 and the second rod 12, and the second fastener 37 passes through the adjustment block 3 to relatively fix the storage basket 2 and the adjustment block 3, in this structure, the second fasteners 37 not only connect the first rods 11 to the second rods 12, but also connect the storage baskets 2 to the upright rods 1, which facilitates the rapid assembly of the storage rack.

In this embodiment, the third adjustment block 33 is detachably arranged on the first rod 11 through the first fastener 36, the first adjustment block 31 is detachably arranged on the second rod 12 through the first fastener 36, the second adjustment block 32 is arranged at the connection between the first rod 11 and the second rod, the second fastener 37 passes through the plug-in part 111 and the side wall of the plug-in hole 121, the second adjustment block 32 and the second storage basket 22 to relatively fix the upright rod 1, the second adjustment block 32 and the second storage basket 22.

Connecting seats 4 are arranged on the upright rods 1, the connecting seats 4 are respectively connected to the ends of the upright rods 1 on both sides of the storage baskets 2, thereby preventing the upright rods 1 from deflecting or bending, this structure is conducive to improving the stability of the storage rack; preferably, the connecting seats 4 at the bottom of the upright rods 1 are provided with support wheels 5 or adjustable support feet, this structure is a common technical scheme in the field of storage racks, personnel in this field can implement this technical scheme. In this embodiment, it is preferable that the top of the upright rods 1 can also be provided with a connecting seat 4, the connecting seat 4 arranged on the top of the upright rods 1 can improve the structural strength of the storage rack.

In this embodiment, the connecting seats 4 are respectively provided with mounting protrusions 43 connected to the upright rods 1 on both sides of the storage basket 2, the upright rods 1 are provided with mounting holes 122, and the mounting holes 122 are located on one side of the adjustment blocks 3, during the assembly of the storage rack, after the mounting protrusions 43 are inserted into the mounting holes 122, the second fasteners 37 pass through the mounting protrusions 43 and the side wall of the mounting holes 122 to relatively fix the upright rods 1 and the connecting seats 4, and secure the connecting seats 4, the upright rods 1, the adjustment blocks 3, and the storage baskets 2 together, in this structure, the second fasteners 37 can not only relatively fix the upright rods 1, the adjustment blocks 3 and the storage baskets 2, but also relatively fix the upright rods 1 and the connecting seats 4, which facilitates the assembly and production of the storage rack.

Figure 11:
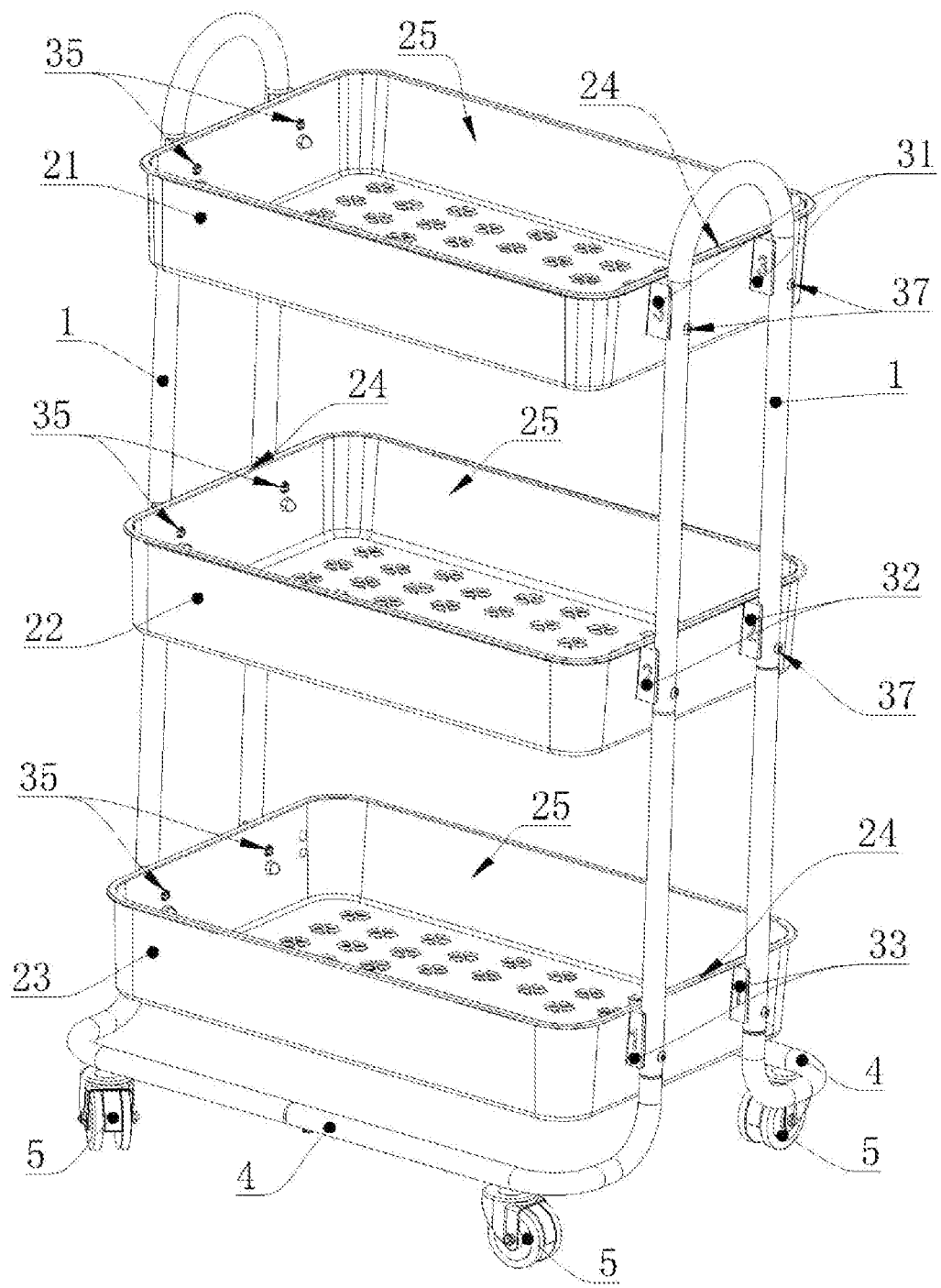
FIG. 11 is a schematic diagram 1 of the structure of the other embodiment of the invention.
Figure 12:
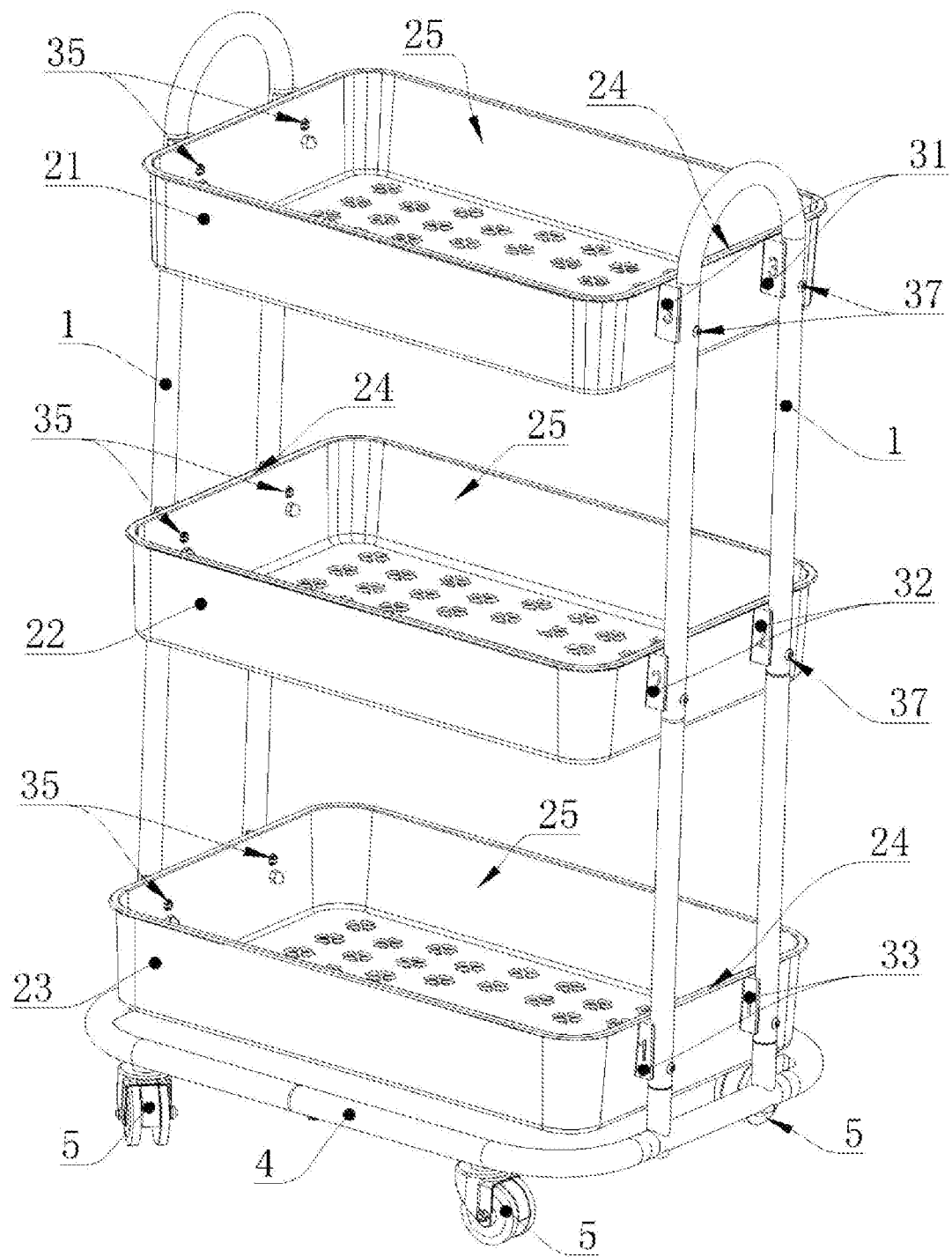
FIG. 12 is a schematic diagram 2 of the structure of the other embodiment of the invention.

The upright rod 1 can be a straight rod or a U-shaped tube as shown in FIG. 11 and FIG. 12, both sides of the U-shaped tubes are provided with adjustment blocks 3, the storage basket 2 is connected to the rods on both sides of the U-shaped tube through the adjustment blocks 3, and both ends of the U-shaped tube are connected to the connecting seats 4 respectively.

In the invention, the connecting seat 4 comprises a first connecting rod 41 and a second connecting rod 42 that are detachably connected, the first connecting rod 41 and the second connecting rod 42 are both provided with mounting protrusions 43, the mounting protrusions 43 on the first connecting rod 41 and the second connecting rod 42 respectively cooperate with the upright rods 1 on both sides of the storage basket 2, the first connecting rod 41 is provided with a plug-in protrusion 411, the second connecting rod 42 is provided with a plug-in slot 421 that matches the plug-in protrusion 411, after the plug-in protrusion 411 cooperates with the plug-in slot 421, the first connecting rod 41 and the second connecting rod 42 are relatively fixed through the third fastener 44, in this embodiment, the lower ends of the upright rods 1 is detachably provided with connecting seats 4, the second fasteners 37 pass through the plug-in protrusions 411, the side walls of the plug-in slots 421, the third adjustment blocks 33 and the third storage basket 23, so that the upright rods 1, the third adjustment blocks 33, the third storage basket 23 and the connecting seats 4 can be relatively fixed.

The storage basket 2 is provided with inclined abutting walls 28 on both sides, and the lower parts of the abutting walls 28 are inclined toward the middle of the storage basket 2, the adjustment block 3 is provided with a supporting wall 38 adapted to the abutting wall 28, the inclined abutting walls 28 and supporting walls 38 allow the adjustment blocks 3 to support the storage baskets 2, which helps to distribute the stress on the storage baskets 2 and ensures stable installation of the storage baskets 2.

In the invention, the storage baskets 2 have inner cavities 25 for storing items, the upper ends of the inner cavities 25 are provided with openings, the cross-sectional areas of the inner cavities 25 gradually decrease from top to bottom, there is a gap between the abutting wall 28 of the first storage basket 21 and the side wall of the inner cavity 25 of the second storage basket 22, which facilitates quick stacking and separation of the storage baskets 2 and makes it convenient for users to use.

In the invention, the adjustment block 3 is provided with a positioning protrusion 34, the positioning protrusion 34 is provided with an elastic hook 35, the side of the storage basket 2 is provided with a positioning hole 26 adapted to the positioning protrusion 34, the elastic hook 35 passes through the positioning hole 26 and keeps the positioning protrusion 34 and the positioning hole 26 matched; the settings of the positioning protrusions 34 and positioning holes 26 facilitate the positioning and installation of the adjustment blocks 3 and the storage baskets 2, the setting of the elastic hooks 35 facilitates the stable connection between the adjustment blocks 3 and the storage baskets 2, and prevents the adjustment blocks 3 and the storage baskets 2 from accidentally detaching during use.

Preferably, the elastic hook 35 is provided with an inclined guide surface 351, and the elastic hook 35 is guided through the positioning hole 26 through the guide surface 351, the setting of the guide surface 351 facilitates the elastic hooks 35 to quickly pass through the positioning holes 26, and facilitates the quick connection and cooperation between the adjustment blocks 3 and the storage baskets 2.

The side of the storage basket 2 is equipped with an annular protruding edge 24, the adjustment block 3 abuts against the protruding edge 24 and supports the storage basket 2, when the first storage basket 21 is placed in the second storage basket 22, the protruding edge 24 on the first storage basket 21 abuts against the upper end of the second storage basket 22, in this structure, the adjustment blocks 3 can support the storage baskets 2 through the protruding edges 24, which is beneficial to dispersing the stress on the storage baskets 2 and avoiding local damage to the storage baskets 2 due to concentrated stress on the storage baskets 2, this structure is conducive to the stable installation of the storage baskets 2 and prevents the storage baskets 2 from tilting and turning over; the setting of the protruding edges 24 facilitates the first storage basket 21 to be completely stored in the second storage basket 22, and facilitates the user to take out the first storage basket 21 from the second storage basket 22.

An installation method for an assembly storage rack comprises the following steps:
A. The pre-installed integrated adjustment blocks 3 and the first connecting rods 41/second connecting rods 42 are respectively installed on both sides of the corresponding storage baskets 2 through the positioning protrusions 34 and the positioning holes 26;
B. The plug-in parts 111 are controlled to cooperate with the plug-in holes 121, so that the first rods 11 and the second rods 12 are connected and installed into the integrated upright rods 1;
C. The plug-in protrusions 411 are controlled to cooperate with the plug-in slots 421, so that the first connecting rods 41 and the second connecting rods 42 are connected to form the connecting seats 4, the first connecting rods 41 and the second connecting rods 42 are relatively fixed through the third fasteners 44;
D. The mounting protrusions 43 on the connecting seats 4 are controlled to be inserted into the upper or lower ends of the upright rods 1, so that the upright rods 1 are connected to the connecting seats 4;
E. The storage baskets 2 are connected with the upright rods 1 through the second fasteners 37, and the first rods 11 and the second rods 12 are relatively fixed through the second fasteners 37; alternatively, the upright rods 1 and the connecting seats 4 are relatively fixed through the second fasteners 37;

Wherein, the user can install the support wheels 5 or the adjustable support feet on the connecting seats 4 in step C, the user can also install the support wheels 5 or the adjustable support feet on the connecting seats 4 after step E.

The above embodiments are only preferred embodiments of the invention and do not limit the protection scope of the invention. Therefore, any equivalent changes made based on the structure, shape, and principle of the invention shall be covered by the protection scope of the invention.

The invention claimed is:

1. An assembly storage rack comprises two sets of vertically arranged upright rods (1), at least two storage baskets (2) are arranged between the upright rods (1), the storage baskets (2) are arranged vertically at intervals, and adjustment blocks (3) are arranged on each of the upright rods (1), the adjustment blocks (3) and the upright rods (1) are relatively fixed and pre-installed as the integral modular components, the storage baskets (2) are detachably connected to the adjustment blocks (3) on the upright rods (1) on both sides;

the storage basket (2) at least comprises a first storage basket (21) and a second storage basket (22) arranged vertically in sequence, a top of the second storage basket (22) is larger than a bottom of the first storage basket (21), the first storage basket (21) can be placed in the second storage basket (22);

the adjustment blocks (3) comprise first adjustment blocks (31) and second adjustment blocks (32);

the first adjustment blocks (31) are arranged between the first storage basket (21) and the upright rods (1), second fasteners (37) pass through and fix the upright rods (1), the first adjustment blocks (31) and the first storage basket (21) in sequence; the effective installation length of the first storage basket and the first adjustment blocks on both sides is L1;

the second adjustment blocks (32) are arranged between the second storage basket (22) and the upright rods (1), the second fasteners (37) pass through and fix the upright rods (1), the second adjustment blocks (32) and the second storage basket (22) in sequence; the effective installation length of the second storage basket and the second adjustment blocks on both sides is L2;

the lengths of L1 and L2 are the same or nearly the same, when the storage rack is in use, the upright rods on both sides remain vertical.

2. The assembly storage rack of claim 1, each adjustment block (3) is provided with a positioning groove (312), and the upright rod (1) is inserted into the positioning groove (312), each adjustment block (3) is provided with a first fastener (36), the first fastener (36) first fixes the adjustment blocks (3) and the upright rod (1), so that the upright rod (1) matches with the positioning groove (312), thereby the adjustment blocks (3) and the upright rod (1) are installed, subsequently, the second fastener (37) passes through and fix the upright rod (1), the adjustment blocks (3) and the storage basket (2) in sequence.

3. The assembly storage rack of claim 2, each adjustment block (3) is provided with a positioning protrusion (34), and both sides of the storage basket (2) are provided with positioning holes (26) adapted to the positioning protrusion (34), the positioning protrusion (34) cooperates with the positioning holes (26) to position and install the storage basket (2) and the adjustment blocks (3).

4. The assembly storage rack of claim 2, both sides of the storage basket (2) are equipped with an annular protruding edge (24), the adjustment blocks (3) abut against the protruding edge (24) and supports the storage basket (2).

5. The assembly storage rack of claim 1, the upright rod (1) comprises a first rod (11) and a second rod (12) that are detachably arranged, the first rod (11) and the second rod (12) are respectively pre-installed with the first adjustment blocks (31) and second adjustment blocks (32), the first adjustment blocks (31) and the second adjustment blocks (32) are respectively provided with indication marks (318), or alternatively, the first rod (11) and the second rod (12) are respectively provided with indication marks (318).

6. The assembly storage rack of claim 5, the first rod (11) is provided with a plug-in part (111), the second rod (12) is provided with a plug-in hole (121), the plug-in part (111) is inserted into the plug-in hole (121), one adjustment block (3) is arranged on the side of the plug-in hole (121), and the second fastener (37) passes through the plug-in part (111) and the side wall of the plug-in hole (121) to relatively fix the first rod (11) and the second rod (12), and the second fastener (37) passes through the adjustment block (3) to relatively fix the storage basket (2) and the adjustment block (3).

7. The assembly storage rack of claim 5, each adjustment block (3) is provided with a positioning protrusion (34), and both sides of the storage basket (2) are provided with a positioning holes (26) adapted to the positioning protrusion (34), the positioning protrusion (34) cooperates with the positioning holes (26) to position and install the storage basket (2) and the adjustment blocks (3).

8. The assembly storage rack of claim 7, the positioning protrusion (34) is provided with an elastic hook (35), the elastic hook (35) passes through the positioning holes (26) and keeps the positioning protrusion (34) and the positioning holes (26) matched.

9. The assembly storage rack of claim 8, the elastic hook (35) is provided with an inclined guide surface (351), and the elastic hook (35) is guided through the positioning holes (26) through the guide surface (351).

10. The assembly storage rack of claim 1, each adjustment block (3) is provided with a positioning protrusion (34), and both sides of the storage basket (2) are provided with positioning holes (26) adapted to the positioning protrusion (34), the positioning protrusion (34) cooperates with the positioning holes (26) to position and install the storage basket (2) and the adjustment blocks (3).

11. The assembly storage rack of claim 10, both sides of the storage basket (2) are equipped with an annular protruding edge (24), the adjustment blocks (3) abut against the protruding edge (24) and supports the storage basket (2).

12. The assembly storage rack of claim 10, the upright rod (1) comprises a first rod (11) and a second rod (12) that are detachably arranged, the first rod (11) and the second rod (12) are respectively pre-installed with the first adjustment blocks (31) and second adjustment blocks (32), the first adjustment blocks (31) and the second adjustment blocks (32) are respectively provided with indication marks (318), or alternatively, the first rod (11) and the second rod (12) are respectively provided with indication marks (318).

13. The assembly storage rack of claim 10, connecting seats (4) are arranged on the upright rods (1), and the connecting seats (4) are respectively provided with mounting protrusions (43) connected to the upright rods (1) on both sides of the storage basket (2), the upright rods (1) are provided with mounting holes (122), and the mounting holes (122) are located on one side of the adjustment blocks (3), during the assembly of the storage rack, after the mounting protrusions (43) are inserted into the mounting holes (122), the second fasteners (37) pass through the mounting protrusions (43) and the side wall of the mounting holes (122) to relatively fix the upright rods (1) and the connecting seats (4), and secure the connecting seats (4), the upright rods (1), the adjustment blocks (3), and the storage baskets (2) together.

14. The assembly storage rack of claim 1, connecting seats (4) are arranged on the upright rods (1), and the connecting seats (4) are respectively provided with mounting protrusions (43) connected to the upright rods (1) on both sides of the storage basket (2), the upright rods (1) are provided with mounting holes (122), and the mounting holes (122) are located on one side of the adjustment blocks (3), during the assembly of the storage rack, after the mounting protrusions (43) are inserted into the mounting holes (122), the second fasteners (37) pass through the mounting protrusions (43) and the side wall of the mounting holes (122) to relatively fix the upright rods (1) and the connecting seats (4), and secure the connecting seats (4), the upright rods (1), the adjustment blocks (3), and the storage baskets (2) together.

15. The assembly storage rack of claim 14, both sides of the storage basket (2) are equipped with an annular protruding edge (24), the adjustment blocks (3) abut against the protruding edge (24) and supports the storage basket (2).

16. The assembly storage rack of claim 14, the upright rod (1) comprises a first rod (11) and a second rod (12) that are detachably arranged, the first rod (11) and the second rod (12) are respectively pre-installed with the first adjustment blocks (31) and second adjustment blocks (32), the first adjustment blocks (31) and the second adjustment blocks (32) are respectively provided with indication marks (318), or alternatively, the first rod (11) and the second rod (12) are respectively provided with indication marks (318).

17. The assembly storage rack of claim 16, the first rod (11) is provided with a plug-in part (111), the second rod (12) is provided with a plug-in hole (121), the plug-in part (111) is inserted into the plug-in hole (121), one adjustment block (3) is arranged on the side of the plug-in hole (121), and the second fastener (37) passes through the plug-in part (111) and the side wall of the plug-in hole (121) to relatively fix the first rod (11) and the second rod (12), and the second fastener (37) passes through the adjustment block (3) to relatively fix the storage basket (2) and the adjustment block (3).

18. The assembly storage rack of claim 14, the storage basket (2) is provided with inclined abutting walls (28) on both sides, and the lower parts of the abutting walls (28) are inclined toward the middle of the storage basket (2), each adjustment block (3) is provided with a supporting wall (38) adapted to the abutting wall (28).

19. The assembly storage rack of claim 1, both sides of the storage basket (2) are equipped with an annular protruding edge (24), the adjustment blocks (3) abut against the protruding edge (24) and supports the storage basket (2).

\* \* \* \* \*